(12) United States Patent
Tissot-Daguette et al.

(10) Patent No.: US 12,546,671 B2
(45) Date of Patent: Feb. 10, 2026

(54) FLEXURE PIVOT BASED SYSTEM

(71) Applicant: ECOLE POLYTECHNIQUE FÉDÉRALE DE LAUSANNE (EPFL), Lausanne (CH)

(72) Inventors: Loïc Tissot-Daguette, Yverdon-les-Bains (CH); Simon Henein, Neuchâtel (CH); Michal Smreczak, Cheseaux-Lausanne (CH); Benoît Dagon, Lausanne (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 226 days.

(21) Appl. No.: 18/256,883

(22) PCT Filed: Dec. 6, 2021

(86) PCT No.: PCT/EP2021/084338
§ 371 (c)(1),
(2) Date: Jun. 9, 2023

(87) PCT Pub. No.: WO2022/122629
PCT Pub. Date: Jun. 16, 2022

(65) Prior Publication Data
US 2024/0019325 A1    Jan. 18, 2024

(30) Foreign Application Priority Data

Dec. 11, 2020 (EP) .................................... 20213347

(51) Int. Cl.
*G01L 5/00* (2006.01)
(52) U.S. Cl.
CPC .......... *G01L 5/0038* (2013.01); *G01L 5/0042* (2013.01)

(58) Field of Classification Search
CPC ...... G01L 5/0038; G01L 5/0042; G01L 5/009
See application file for complete search history.

(56) References Cited

U.S. PATENT DOCUMENTS

| 11,123,145 B2 * | 9/2021 | Dearden | ............... B25J 15/0233 |
| 2007/0236778 A1 * | 10/2007 | Malone | .............. G02B 26/0841 |
| | | | 359/299 |

(Continued)

FOREIGN PATENT DOCUMENTS

| EP | 0098706 B1 * | 2/1987 | ........... G01L 1/2243 |
| EP | 3722767 A1 | 10/2020 | |

(Continued)

OTHER PUBLICATIONS

International Search Report for PCT/EP2021/084338 mailed Feb. 10, 2022, 3 pages.

(Continued)

*Primary Examiner* — Francis C Gray
(74) *Attorney, Agent, or Firm* — NIXON & VANDERHYE

(57) ABSTRACT

Disclosed is a flexure pivot based system being one of: a force sensor, a force limiting device arranged to exert a predetermined threshold force, a torque limiting device arranged to exert a predetermined threshold torque, a programmable mechanical memory, or an accelerometer, the flexure pivot based system including a substantially rigid frame supporting a lever by a suspension mechanism including: a first flexure extending from the frame to a junction with the lever; a second flexure extending from the frame to the junction at a first non-zero angle to the first flexure in a neutral position of the suspension mechanism; and a third flexure extending from the junction to a preloading system at a second non-zero angle to the first flexure and/or the second flexure in the neutral position, the preloading system (Continued)

applying a force in a direction substantially coaxial with the third flexure.

17 Claims, 8 Drawing Sheets

(56) References Cited

U.S. PATENT DOCUMENTS

2015/0209159 A1* 7/2015 Goldfarb .................. A61F 2/66
73/862.541
2020/0056950 A1* 2/2020 Strauss .................. B25J 13/085

FOREIGN PATENT DOCUMENTS

WO 2011120180 A1 10/2011
WO 2020207911 A1 10/2020

OTHER PUBLICATIONS

Written Opinion of the ISA for PCT/EP2021/084338 mailed Feb. 10, 2022, 7 pages.
Chajes, Alexander, "Principles of Structural Stability Theory", Prentice-Hall, 1974, pp. 1-175.
Esteveny, L., et al., "Variable Stiffness Mechanism in Robotized Interventional Radiology", 2016, pp. 45-58.
Fang, Lijin et al., "Stiffness Analysis of a Variable Stiffness Joint Using a Leaf Spring", ICIRA 2017, Part II, LNAI 10463, 2017, pp. 225-237.
Henein, Simon et al. "The Art of Flexure Mechanism Design", Presses polytechniques et universitaires romandes, 2017, pp. 1-267.

* cited by examiner

FLEXURE PIVOT BASED SYSTEM

CROSS-REFERENCE TO RELATED APPLICATIONS

This application is the U.S. national phase of International Application No. PCT/EP2021/084338 filed Dec. 6, 2021, which designated the U.S. and claims priority to EP 20213347.6 filed Dec. 11, 2020, the entire contents of each of which are hereby incorporated by reference.

TECHNICAL FIELD

The present invention relates to the field of flexure pivot mechanisms. More specifically, it relates to a force sensor based on such a flexure pivot mechanism.

STATE OF THE ART

Document EP3722767 describes various embodiments of flexure pivot based devices for measuring a force exerted on an object.

In the construction of FIG. 3 of this document, a probe is held suspended by a Remote Centre Compliance (RCC) pivot attached to a rigid body, which is itself attached to a rigid lever by means of crossed blades so as to define a pivot point which is coincident with the extension of the blades of the RCC pivot in an unstressed state. A set screw acting on an arm of the rigid body enables zero-point of this pivot to be modified, and the rigid lever comprises a probe tip adapted to be brought into contact with an object.

The stiffness of the pivot can be further adjusted by means of a second flexure arrangement comprising a knee joint, which is arranged so as to be able to apply a force to the rigid lever along an axis intersecting the centre of rotation as defined by the RCC and crossed blade pivot, which prestresses the RCC pivot and modifies its effective rigidity.

When the probe tip is brought into contact with an object, the rigid lever is caused to rotate, this rotation being measured by a sensor.

Overall, this construction is complicated, and requires a large number of individual flexures to construct. Also, it is difficult to balance the rigid lever, leading to sensitivity to the direction of the gravity vector, and its linearity of response leaves room for improvement.

An object of the present invention is hence to at least partially overcome some of the above-mentioned drawbacks of the prior art.

DISCLOSURE OF THE INVENTION

More precisely, the invention relates to a flexure pivot based system defined by claim 1. This system is one of: a force sensor, a force limiting device arranged to exert a predetermined threshold force, a torque limiting device arranged to exert a predetermined threshold torque, a programmable mechanical memory, or an accelerometer for measuring linear and/or angular accelerations.

The system comprises a substantially rigid frame supporting a lever by means of a suspension mechanism, this suspension mechanism comprising:
- a first flexure extending from said frame to a junction with said lever;
- a second flexure extending from said frame to said junction and arranged at a first non-zero angle to said first flexure when said suspension mechanism is in a neutral position (i.e. when the suspension mechanism is not subject to any stress causing it to deform in any manner),
- a third flexure extending from said junction to a preloading system at a second non-zero angle to at least one of said first flexure and said second flexure when said suspension mechanism is in a neutral (i.e. unconstrained) position, said preloading system being arranged to apply a force with a component which is substantially coaxial with said third flexure.

Each of the flexures can be individually chosen from a blade flexure, a bar terminated at each end by a blade, a circular notch hinge, or other type of necked down flexible hinge, or crossed blades as is generally known, and they may all have the same or different lengths. Furthermore, the first non-zero angle can be acute or obtuse, and is advantageously 90° such that the first and second flexures are orthogonal with respect to each other when the suspension mechanism is in a neutral position.

By varying the force applied by the preloading system to the third flexure, the stiffness of the pivot defined by the first, second and third flexures can be tuned within large bounds, and may be increased or decreased to a substantial degree, thereby modifying the response of the lever when a force, torque or acceleration tending to rotate the lever with respect to the frame is applied thereto. This can be observed by eye or detected e.g. by means of a convenient sensor.

On the one hand, the stiffness of said pivot can be increased by applying said force by means of said preloading system in a particular direction so as to reduce the angular sensitivity of the lever to a given applied force or acceleration of the frame, which is of particular interest in the case of the system being a force sensor or an accelerometer, in order to vary its sensitivity.

On the other hand, this stiffness can be decreased to the point at which it is effectively zero by applying said force in the opposite direction, and hence any rotational force applied to the lever (whether directly or due to an acceleration applied to the frame) will cause it to rotate with respect to the frame, allowing the system use as an extremely sensitive force or acceleration sensor.

Furthermore, the stiffness can be made negative around the neutral position of the lever, resulting in the suspension being bistable and the lever having two stable positions. In such a case, once a predetermined threshold exceeding force has been applied to the lever which tends to rotate it towards its other stable position (either by application of a force or torque to the lever or via a linear or angular acceleration of the system causing the lever to rotate about its centre of rotation with respect to the frame), it will move into said other stable position, the force sensor thereby detecting that the threshold force has been exceeded. This predetermined threshold is set by varying the force applied by the preloading system. This enables the system to be used as a threshold force sensor, a threshold acceleration sensor, a force or torque limiting device, or a programmable mechanical memory.

At the same time, this system is significantly simpler than that of EP3722767 since it only requires three flexures in its suspension mechanism, and its response can be more linear.

In one configuration, the third flexure is substantially coaxial with the first flexure in a neutral position of said suspension mechanism, and hence makes said second non-zero angle with respect to the second flexure. This is a so-called "T" configuration. In such a case, the third flexure extends along a principal axis in a neutral position of said suspension, and it is possible to arrange said junction and said second flexure such that said second flexure intersects said principal axis at a point of rotation defined by said suspension, e.g. by shaping the junction as a "U" with the second flexure attached to the inside of this form and the other two flexures attached to the outside of the arms of the U. Advantageously, the ratio of length of the second flexure between said point of rotation and its attachment point with said junction compared to the overall length of said second flexure is substantially 1/2 or 1/8. A ratio of 1/8 is advantageous in order to cancel vertical parasitic translation, and a ratio of 1/2 minimises stress in the second flexure.

In a different configuration, the third flexure is at an obtuse angle, preferably at substantially 135°, to each of the first flexure and second flexure in a neutral position of said suspension mechanism, with the first and second flexures being symmetrical with respect the third flexure (in particular with respect to the extension of its longitudinal axis) in this state. In other words, the first and second flexures make an acute angle of 45° with respect to the extension of the longitudinal axis of the third flexure, and are situated on opposite sides thereof. This is a so-called "Y" configuration, which functions in a similar manner to the T configuration, but allows a greater degree of symmetry which helps with balancing the lever, and can be very compact.

In order to be able to adjust the rest position of the lever, said second flexure may be coupled to said frame by means of an adjustment system arranged to apply an offset torque to said second flexure. This adjustment system may comprise a Remote Centre Compliance flexure pivot system and an adjustment arm, said adjustment arm being movable in rotation. This Remote Centre Compliance flexure pivot system can advantageously be arranged so as to define a pivot point located substantially at a midpoint of said second flexure, which minimises any parasitic displacements and resulting parasitic change of the pivot stiffness as the offset is adjusted.

Advantageously, the first flexure, second flexure, third flexure, lever and preloading system are substantially coplanar, as is the case e.g. when the system is etched from a plate of material or similar.

Advantageously, said preloading system comprises a plurality of parallel flexures, which supply a spring force. In order to avoid forces and torques in undesired directions, the extension of said third flexure in a neutral position of said suspension advantageously intersects a midpoint of said plurality of parallel flexures.

In order to balance the lever so as to prevent rotation of the lever depending on the orientation of the system with respect to the gravity vector, at least one adjustable mass can be provided on an arm of said lever. Preferably, two adjustable masses are provided on two different arms of the lever. Setting the position of the mass or masses can be used to bring the centre of mass of the lever as close to its pivot point as possible.

In order to measure the lever's reaction to a force applied thereto automatically (i.e. without having to observe the lever by eye or by camera), a sensor may be fixed to said frame and arranged to measure the position of said lever, directly or indirectly.

As noted above, the preloading system can be arranged to apply a force to the third flexure with a magnitude and sign sufficient to render said lever bistable, or alternatively with a magnitude and sign sufficient to give substantially no resistance to rotation of said lever, i.e. the pivot has substantially zero stiffness.

BRIEF DESCRIPTION OF THE DRAWINGS

Further details of the invention will become apparent in the following text, in reference to the appended figures which illustrate.

EMBODIMENT OF THE INVENTION

Figure 1:
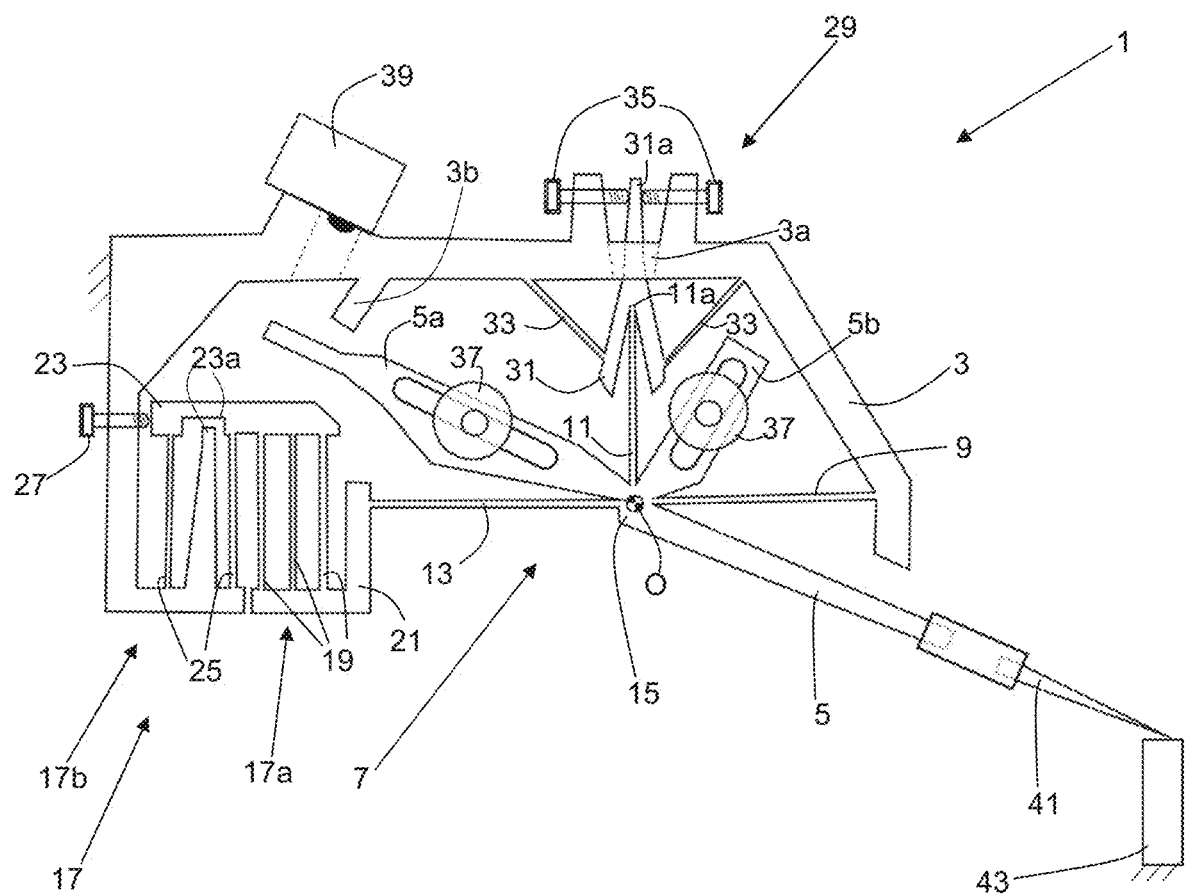
FIG. 1: a schematic plan view of an embodiment of a flexure pivot based system according to the invention, in the context of a force sensor.

FIG. 1 illustrates a flexure pivot based system 1 according to the invention, in the form of a force sensor in its neutral position. This same configuration of flexure pivot based system can also be used as a force limiting device arranged to exert a predetermined threshold force, a torque limiting device arranged to exert a predetermined threshold torque, a programmable mechanical memory, or accelerometer for the measurement of external angular or linear accelerations, as will become apparent below.

System 1, which has an overall planar form, comprises a substantially rigid frame 3, which supports a substantially rigid lever 5 by means of a suspension mechanism 7. In the present specification, "substantially rigid" should be understood as being sufficiently rigid so as not to undergo elastic deformation which influences the function of the system 1 in use when subjected to the typical forces applied during operation, whereas the term "elastic" indicates that elastic deformation in at least one predetermined direction is present in use.

Suspension mechanism 7 is based around a flexure pivot comprising three flexures 9, 11, 13 arranged in a particular shape in the plane of the system 1 and which join the lever 5 at a junction 15, defined as the part or zone of the lever 5 to which the three flexures 9, 11 and 13 are attached, irrespective of its overall shape or the proximity of the three points of attachment of the flexures 9, 11, 13.

More precisely, the suspension mechanism 7 as illustrated in FIG. 1 has a T-shaped configuration, and comprises a first flexure 9 extending from the frame 3 to said junction 15, a second flexure 11 extending from the frame 3 to said junction 15 in a direction which is substantially orthogonal to said first flexure 9 when the suspension mechanism 7 is in a neutral position, and a third flexure 13 which extends from the junction 15 to a preloading system 17 and is substantially coaxial with the first flexure 9 when the suspension mechanism 7 is in a neutral position (as illustrated, and referred to as the "principal axis" in the foregoing). As a result, the third flexure 13 makes a non-zero angle (specifically 90° in the illustrated embodiment) with the second flexure 11, and a zero angle with respect to the first flexure 9. The three flexures 9, 11 and 13 thereby form a flexure pivot which defines a centre of rotation O at a point where the extension of the axis of the second flexure 13 crosses the principal axis. An alternative embodiment in which the three flexures 9, 11, 13 are in a different configuration is described below, and as a result the T-configuration illustrated in FIG. 1 is not to be held as limiting. Furthermore, in a non-illustrated variant of the embodiment of FIG. 1, it is not obligatory that the second flexure 11 be orthogonal to the first flexure 9, in which case the angle between these two flexures 9, 11 is simply also a non-zero angle, a range between 10° and 170°, preferably between 45° and 135° being preferred.

In a simpler embodiment than that illustrated, the second flexure 11 may be attached directly to the frame 3 at its root. Since the manner in which the second flexure 1 is attached to the frame 3 is not essential, we will return to this point below after discussion of the preloading system 17.

In general, the preloading system 17 applies an adjustable compressive or tensile force in a direction coaxial with the principal axis, and can take any convenient form, allowing to vary the effective stiffness of the suspension 7 between wide bounds, and even to make it negative, resulting in the suspension 7 being bistable and the lever 5 hence having two stable positions. The principle behind this mode of operation will be explained in greater detail below in the context of FIGS. 4-10.

In the illustrated embodiment, the preloading system 17 comprises a first parallel spring stage 17a comprising three parallel flexures 19 joining a substantially rigid first bar 21 of L-shaped form joining a substantially rigid second bar 23 of linear form which is itself linked to the frame 3 by means of a second parallel spring stage 17b comprising a pair of parallel flexures 25. First parallel spring stage 17a serves to apply the preloading force, and second parallel spring stage 17b serves for linear guidance.

The overall construction of the preloading system 17 enables a preload force to be applied to the third flexure 13 in the direction mentioned above (this force being transmitted to at least one of the other flexures 9, 11 as appropriate in function of the geometry of the arrangement), and to this end the parallel flexures 19, 25 are substantially parallel to each other and substantially perpendicular to the principal axis when the system 1 is unstressed, the extension of the principal axis intersecting the parallel flexures 19, 25 at their midpoint in order to reduce or eliminate parasitic displacements which are at an angle to said axis. This is, however, not obligatory. The parallel flexures 19, 25 as illustrated all have substantially the same length, but this likewise not have to be the case (although it is advantageous).

The preload force is predetermined by means of an actuator 27 which acts upon the second bar 23 so as to position it with respect to the frame 3 according to a direction parallel to the principal axis. By moving the second bar 23 in this direction towards the second flexure 11, a compressive force can be applied to the first and third flexures 9, 13, whereas by moving it in the opposite direction, a tensile force can be applied thereto. An overtravel stop 23a may be provided so as to prevent the second bar 23 from being moved sufficiently to damage any of the flexures 19, 25.

In the illustrated embodiment, the actuator 27 is a simple screw, but it can equally be a mobile wedge, an exchangeable shim, or a piezoelectric or other type of actuator enabling the preload force to be varied remotely. Furthermore, it should be noted that the shape of the various rigid elements of the preload system 17 (i.e. the rigid bodies 21, 23) can be determined at will, and those illustrated are not limiting, and the shape of the lever 5 and frame 3 can again be determined on an ad-hoc basis.

In an alternative construction (not illustrated), the preload force can be applied by means of a force actuator such as a voice coil, thereby eliminating the first parallel spring stage 17a, and other types of linear guidance (such as linear bearings) can also be used instead of second parallel spring stage 17b.

In order to adjust the offset of the position of the lever 5 when the system 1 is at rest, an offset mechanism 29 is provided, which is interposed between an extremity 11a of the second flexure 11 and the frame 3, permitting a torque to be applied to the second flexure 11 which then causes a rotation of the lever 5 in its rest position without affecting any other property of the system 1. However, such an offset mechanism 29 is optional.

In the illustrated embodiment, the extremity 11a, which is naturally the extremity which is not attached to the junction 15, is attached to a forked lever 31 supported by an RCC flexure pivot 33 which advantageously defines a virtual pivot point at the midpoint of the second flexure 11, although other positions for the virtual pivot point are possible.

The forked lever 31 has an adjustment arm 31a which is pivoted on the frame 3 and traverses it e.g. in a slot 3a, and which can be positioned angularly by means of a pair of opposed screws 35 or a similar arrangement. Other arrangements are of course possible, particularly those which permit a coplanar arrangement susceptible to be fabricated by technologies such as EDM, etching from a single plate and similar for the system 1.

In order to render the system insensitive to its orientation with respect to the gravity vector, the lever 5 may comprise one or more masses 37 provided on conveniently-located arms 5a, 5b of the lever 5, and adjustable so as to bring the centre of mass of the lever substantially coincident with its centre of rotation O. Alternatively, the centre of mass can be rendered coincident with the centre of rotation O by means of careful design of the overall shape of the lever 5. However, if the orientation of the system 1 will be fixed and predetermined with respect to the gravity vector, or in a low-precision role, such measures are not required.

Overtravel of the lever 5 may be prevented e.g. by means of a conveniently-located overtravel stop 3b of any convenient form provided on the frame 3 and arranged to cooperate with part of the lever 5, or this latter may simply abut the frame 3.

System 1 as illustrated also comprises a sensor 39 of any convenient type (e.g. optical, ultrasonic, capacitive or similar) fixed to the frame 3 and arranged to measure the position of the lever 5 by detecting the position of its arm 5a, however this feature is optional since position of the lever 5 can be determined visually, i.e. by eye. As illustrated, a hole is provided through the frame 3 so that the sensor 39 can detect the position of the arm 5a of the lever 5, but other solutions are possible.

The configuration and use of the lever 5 depends on the type of device as which the system 1 is arranged to operate. In the case of a force sensor, an optional detachable probe 41 may be attached to an extremity of the lever 5 and considered as forming a part thereof, and is brought into contact with a surface of an object 43, causing the lever 5 to pivot, this pivoting being measured by the sensor 39 and transmitted e.g. to a computer or other receiving device. This applies in the case that the system 1 is a conventional force sensor (in which the stiffness of the suspension 7 is zero or positive), and also in which it measures the application of a threshold force (in which the stiffness of the suspension 7 is negative and the lever 5 is hence bistable).

The exact same setup can serve as a force or torque limiting device, the stiffness of the suspension 7 again being made to be negative by means of the preloading device 17 and the optional probe (or simply part of the lever) being again brought into contact with an object 43. Once the predetermined threshold force or torque has been applied to object 43, the lever 5 jumps to its other stable angular position, preventing a greater force or torque than the threshold from being applied to the object 43.

Again, in the case of a programmable mechanical memory, the system 1 can be set up so that the suspension 7 and lever 5 are bistable, the position of the lever 5 being determined either by mechanically moving it from one stable state to the other, or by means of an actuator (electrostatic, piezoelectric, electromagnetic or similar). The position of the lever 5 can hence be used to store binary information, one of its stable positions being defined as a value of "0", the other as a value of "1".

In the case in which the system 1 is an accelerometer, the lever 5 does not enter into contact with an object 43, since its rotation with respect to the frame 3 is generated by an external acceleration of the whole system being resisted by the inertia of the lever 5. If the lever 5 is equilibrated with respect to the centre of rotation O, the system will be sensitive to angular accelerations only. If lever 5 is unbalanced, it will also be sensitive to linear accelerations, including to the direction of the gravity vector and can hence be used to detect linear accelerations and also the orientation of the system 1 with respect to the gravity vector. In this latter case, the system 1 can even serve as an orientation sensor. The overall mass of the lever 5, its distribution (and hence moment of inertia) and the position of its centre of mass can be varied by means of the masses 37 or by the construction of the lever, and its shape can be determined as required. Its sensitivity can again be set by means of the preloading system 17. In a similar manner to that discussed above, if the stiffness of the suspension 7 is negative, this latter and the lever 5 are bistable, and exceeding a threshold acceleration can be detected. A possible application of this principle is as a recording accelerometer for e.g. crash test dummies, detection of items having been dropped or similar, in which the stiffness of the suspension 7 is tuned such that the lever 5 changes position at a certain threshold acceleration. If, upon inspection, the lever 5 has indeed changed position, it is known that the system 1 has been subjected to an acceleration exceeding the predetermined threshold.

Figure 2:
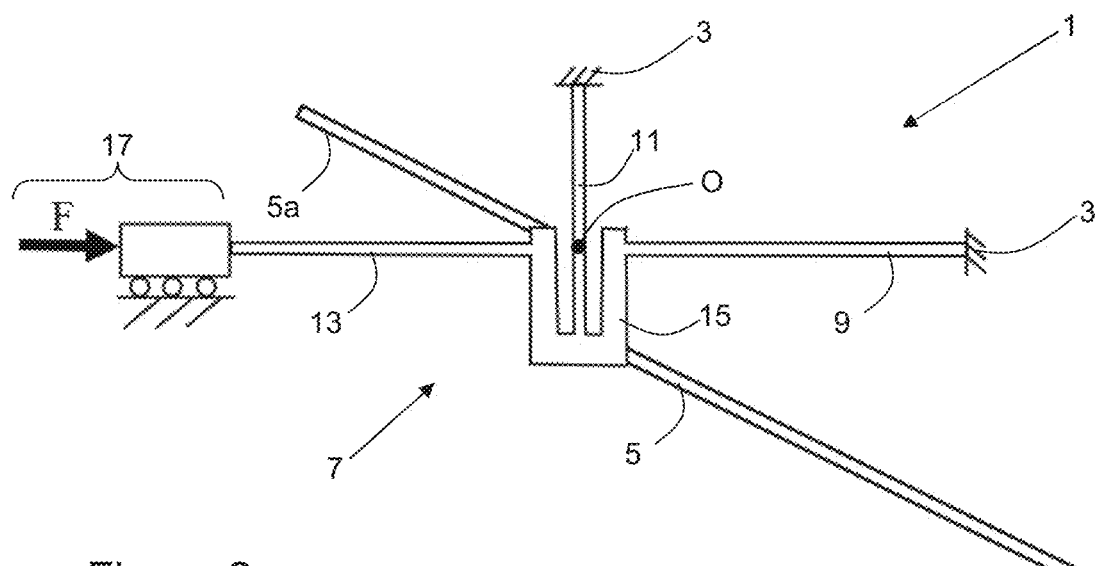
FIG. 2: a schematic plan view of an alternative configuration of part of a flexure pivot based system according to the invention.

FIG. 2 illustrates schematically a further embodiment of a system 1 according to the invention, in which the preloading system 17 has simply been illustrated as a slider and a force F, and the offset mechanism 29 has not been included. As a result, the second flexure 11 is attached directly to the frame 3. In this embodiment, the junction 15 portion of the lever 5 is formed as a U-shaped substantially rigid body, arranged such that the second flexure 11 crosses the principal axis, and hence intersects the centre of rotation O before attaching at the interior base of the U-shape. The first and third flexures 9, 13 are each attached to the outside of the arms of the U, in such a manner that their points of attachment are aligned with the centre of rotation O.

The ratio of the length of the second flexure 11 between the centre of rotation O and the junction 15 with respect to the total length of the second flexure 11 may be chosen at will, but a ratio of 1/8 is advantageous in order to cancel vertical parasitic translation, or 1/2 in order to minimise stress in the second flexure 11.

This arrangement can be incorporated into the arrangement of FIG. 1 if desired.

Figure 3:
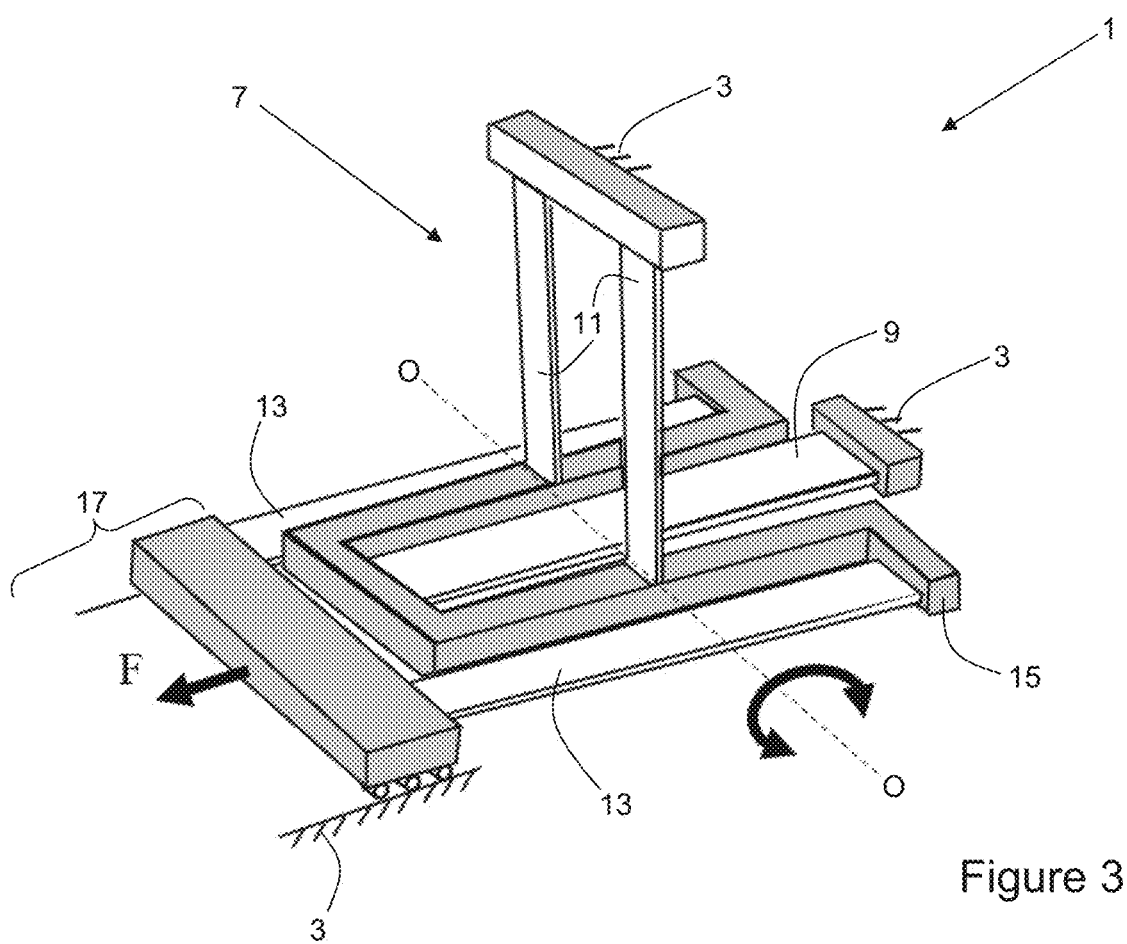
FIG. 3: a schematic plan view of another alternative configuration of part of a flexure pivot based system according to the invention.

FIG. 3 illustrates schematically yet another variant of a device according to the invention, in which the second flexure 11 is split into two parallel sub-flexures, as is the third flexure 13. They are joined by a U-shaped junction 15 to which the lever 5 (not illustrated) can be attached, the branches of the "U" shape being terminated in flanges to which the sub-flexures forming the third flexure 13 are attached. The sub-flexures of the second flexure 11 are each attached to a mid-point of the respective branches of the "U", and extend orthogonal thereto when the suspension mechanism 7 is in a neutral position. Again, the preloading system 17 has simply been illustrated by means of a slider and a force F applied thereto.

The configuration of FIG. 3 enables a reduction in stiffness of the suspension mechanism 17 by means of a tensile force, i.e. one tending to place the first flexure 9 and the third flexure 13 in tension, rather than the compressive force needed for FIG. 1, as will become clear below.

Figure 4:
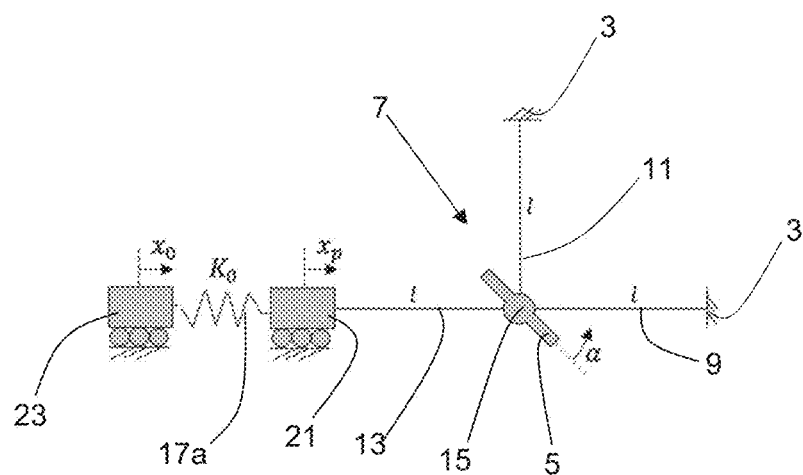
FIGS. 4-7: schematic views of a simplified model of a flexure pivot based system according to the invention.
Figure 5:
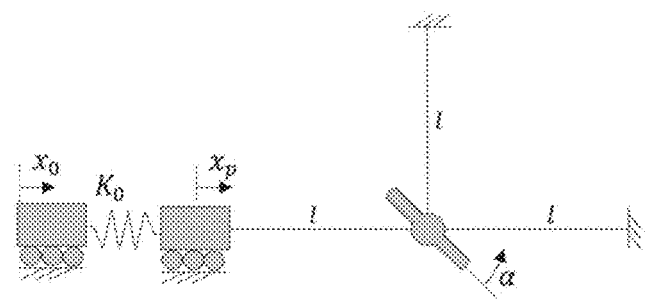
Figure 6:
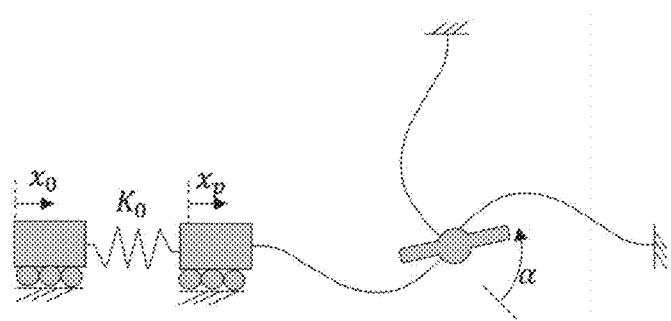
Figure 7:
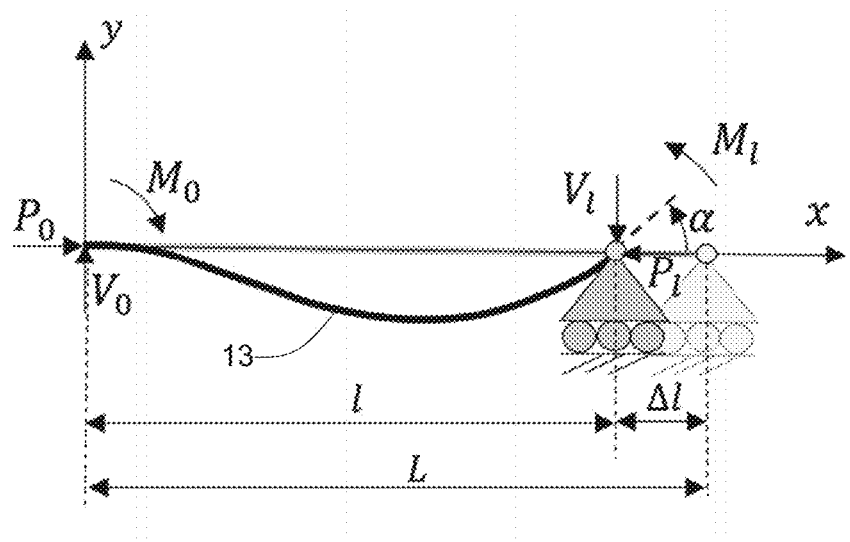

FIGS. 4-6 illustrate the principle of operation of the system 1 of FIG. 1, in simplified form. The reference signs corresponding to those on FIG. 1 have been placed only on FIG. 4, and the second flexure 11 is attached directly to the frame 3 in a similar fashion to FIGS. 2 and 3.

Each of the first, second and third flexures 9, 11, 13 has a length 1, which is substantially identical for each of the three, as is the breadth and height, such that each of these flexures 9, 11, 13 has substantially the same mechanical properties. However, this does not have to be the case, and the dimensions of each blade can be chosen individually. The rotation of the lever 5 about its pivot point is defined as α, the displacement of the first rigid bar 21 along the principal axis is defined as $x_p$, and that of the second bar 23 is defined as $x_0$, each of these bars 21, 23 being schematically illustrated as simple frictionless sliders. Finally, the first spring stage 17a is represented simply by a spring with a spring constant of $K_0$.

In FIG. 4, the system 1 is at rest, with i.e., $x_0=x_p=\alpha=0$, and the strain energy of the overall structure $E_{pot}=0$.

When a displacement $x_0$ tending to compress the first and third flexures 9, 13 (i.e. to the right on FIGS. 4-6) is applied to the second bar 23 (see FIG. 5), potential energy is stored in the first spring stage 17a. When the pivot angle α is increased (see FIG. 6), a certain amount of this spring energy is released due to the first and third flexures 9, 13 shortening and creating displacement $x_p$ of the first rigid bar 21, this energy assisting in bending the blades of the suspension mechanism 5 and hence reducing its stiffness. In the opposite case, i.e. if displacement $x_0$ stretches the first spring stage 17a, this provides an extra force which must be overcome when causing the lever 5 to rotate, thereby increasing the effective stiffness of the suspension 7.

As a result, the pivot stiffness of the suspension 7 can be tuned in both a positive and negative direction by control of displacement $x_0$, and if $x_0$ is carefully tuned, the suspension 7 can have substantially zero stiffness. If $x_0$ exceeds the value for zero stiffness, a bistable pivot can be created, allowing use of the system 1 in the roles discussed above. This threshold contact force can of course be tuned as desired within wide limits by tuning $x_0$.

A detailed analysis of the suspension 7 illustrated in FIGS. 4-6, which is directly applicable to the construction of FIG. 1, now follows, in reference to FIGS. 7 to 10, on the hypothesis that the value of $x_p$ depends on the pivot angle α, and also on $x_0$ and $K_0$, and as a result, the compressive force $P_0$ created by the spring when computing the deflection of the pivot blades (i.e., buckling effect is taken into account).

It is assumed that the three blades 9, 11, 13 of length L are initially straight slender beams and that they have approximately the same deflection. Hence, for the calculations the deflection for one blade only needs to be computed, and the third blade 13 on the left has been chosen (see FIG. 7 for the simplified model and for the notation used).

Blade shortening Δl is considered to be small compared to the blade length L, and as a result the approximation l≅L can be made. The displacement of the centre of rotation of the beam 5 from its position in which the system 1 is unstressed can likewise be assumed to be small compared to the blade length L, is thus set to zero for the blade deflection calculation.

The blade deflection is first computed using Euler-Bernoulli static beam equation:

$$M(x) = EI y''(x) \qquad (1)$$

where EI is the beam bending stiffness and M(x) is the bending moment in the beam. The latter value is related to the beam reaction forces and moments:

$$M(x) = -P_0 y(x) + V_0 x + M_0 \qquad (2)$$

Combining Eqs. (1) and (2), a differential equation is obtained. After solving this equation and using the boundary conditions $y(0)=0$ and $y'(0)=0$, the following solution for the beam deflection is obtained:

$$y(x) = A(\sin(kx) - kx) + B(\cos(kx) - 1) \qquad (3)$$

Where:

$$k = \sqrt{\frac{P_0}{EI}} \qquad (4)$$

$$A = -\frac{V_0}{kP_0} \qquad (5)$$

$$B = -\frac{M_0}{P_0} \qquad (6)$$

The boundary condition y(l)=0 gives:

$$\frac{B}{A} = \frac{kl - \sin(kl)}{\cos(kl) - 1} \qquad (7)$$

The rigidity of the pivot $K_{\alpha,0}$ is defined as follows:

$$K_{\alpha,0} = \frac{M_l}{\alpha} \qquad (8)$$

with the pivot moment $M_l$ defined as:

$$M_l = M_0 + V_0 l = -\frac{EI}{l^2}(kl)^2 A \frac{kl\cos(kl) - \sin(kl)}{\cos(kl) - 1} \qquad (9)$$

And the angle α, considered to be small, can be expressed as:

$$\alpha = y'(l) = -Ak \frac{kl\sin(kl) + 2(\cos(kl) - 1)}{\cos(kl) - 1} \qquad (10)$$

Substituting Eqs. (9) and (10) in (8), the rigidity $K_{\alpha,0}$ becomes:

$$K_{\alpha,0} = \frac{EI}{l} kl \frac{kl\cos(kl) - \sin(kl)}{kl\sin(kl) + 2(\cos(kl) - 1)} \qquad (11)$$

The product kl is linked to the compressive force $P_0$ with Eq. (4), thus:

$$P_0 = \frac{EI(kl)^2}{l^2} \qquad (12)$$

This force results from the compression of the linear spring with the relation:

$$P_0 = K_0(x_0 - x_p) \qquad (13)$$

On the hypothesis that $x_p$ is small compared to $x_0$:

$$P_0 \cong K_0 x_0 \qquad (14)$$

Using Eqs. (12) and (14), the product kl depends on $x_0$:

$$kl = \sqrt{\frac{K_0 l^2}{EI} x_0} \qquad (15)$$

Figure 8:
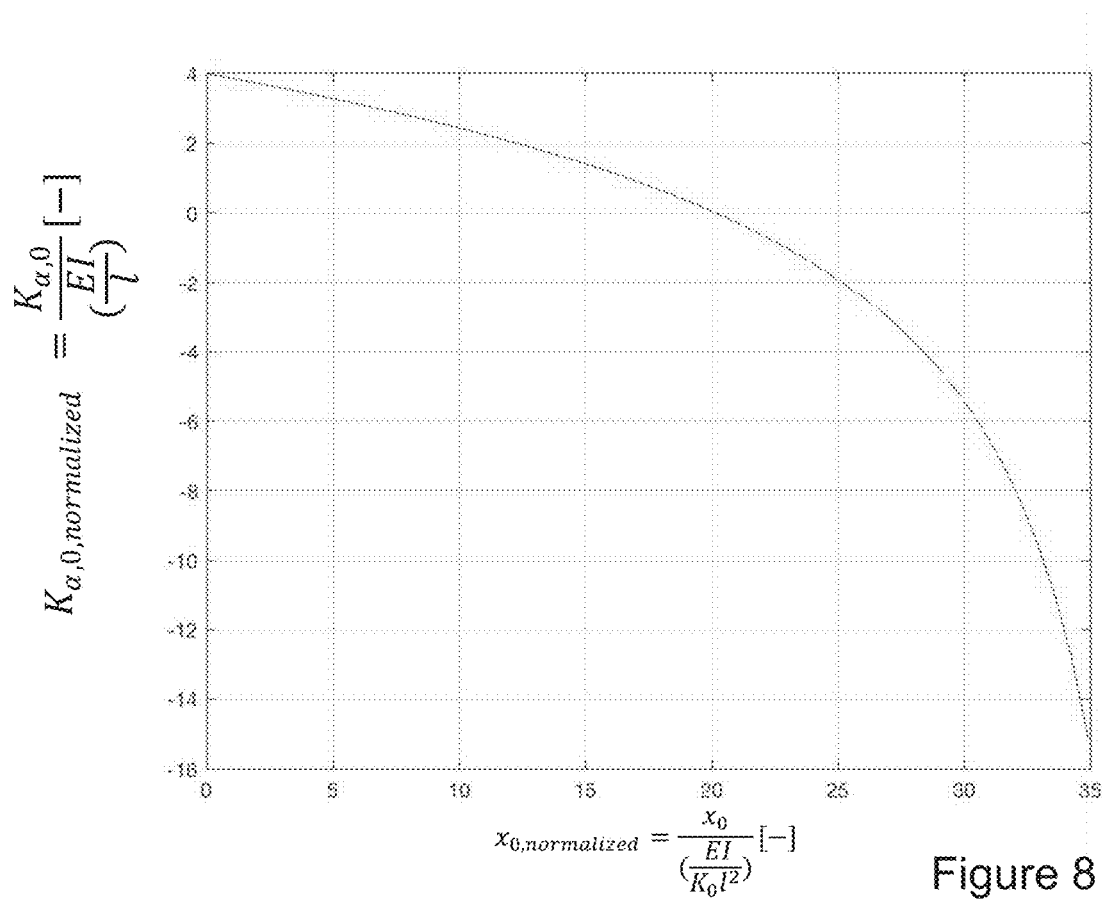
FIGS. 8-10: various graphs of relating to the simplified model of FIGS. 4-7.
Figure 10:
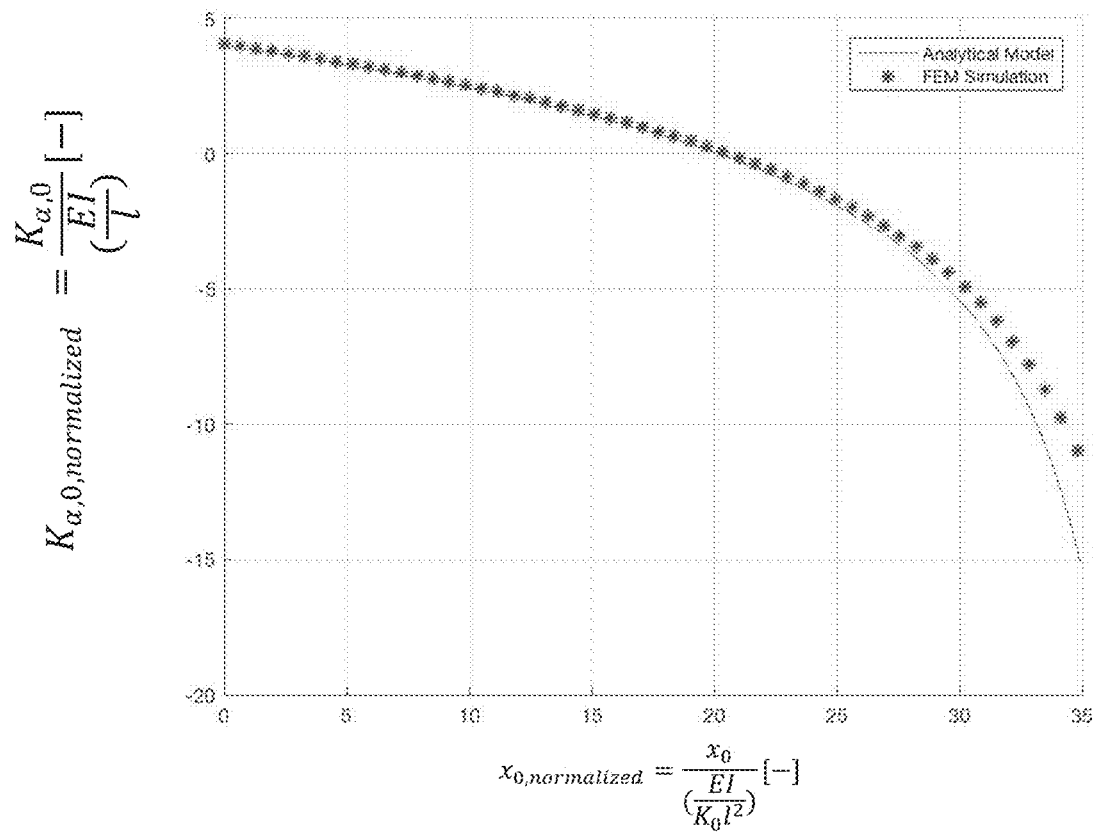

With Eqs. (11) and (15), we obtain a relation between the rigidity $K_{\alpha,0}$ and $x_0$. The normalized graph of $K_{\alpha,0}$ in function $x_0$ is shown in FIGS. 8 and 10.

It can thus be observed that that the rigidity $K_{\alpha,0}$ is null when kl=4.49. This corresponds to the situation where the force $P_0$ is equal to the Euler's critical load of a clamped-pinned beam. If kl<4.49, the beam is monostable and the rigidity $K_{\alpha,0}$ is thus positive. If kl>4.49, the beam is bistable and the rigidity $K_{\alpha,0}$ is thus negative. However, kl≥2π should be avoided, because the beam becomes unstable even if the angle α is fixed (kl=2π means that $P_0$ is equal to the Euler's critical load of a clamped-clamped beam).

To expand this teaching now to the pivot composed of the first, second and third flexures 9, 11, 13, the pivot stiffness $K_\alpha$ of the arrangement can be defined as the sum of the three blade rigidities:

$$K_\alpha = K_{\alpha,first\ flexure} + K_{\alpha,second\ flexure} + K_{\alpha,third\ flexure} \qquad (16)$$

The two horizontal beams (i.e. first and third flexures 9, 13) have a rigidity $K_{\alpha,0}$, stated in Eq. (11). The vertical beam (i.e. the second beam) has no applied compressive load ($x_0=0$), thus using the graph in FIG. 8:

$$K_{\alpha,second\ flexure} = 4\frac{EI}{l} \qquad (17)$$

Figure 9:
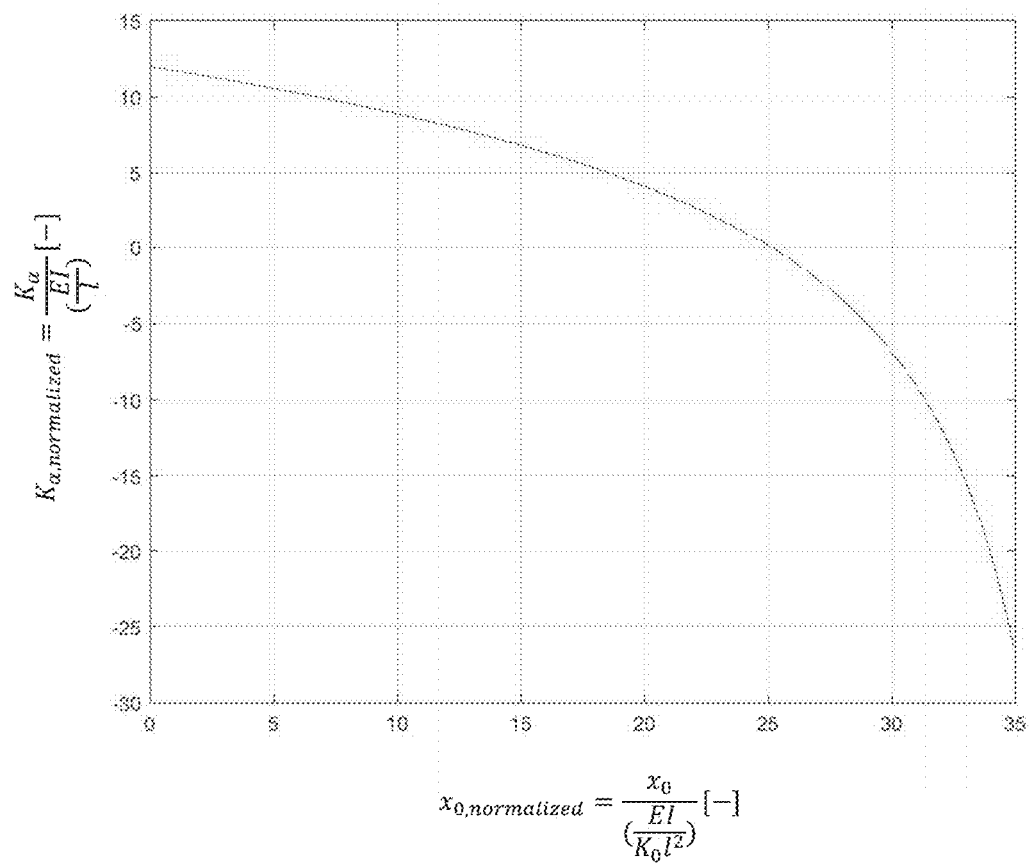

Hence, substituting Eqs. (11) and (17) in (16), the pivot stiffness $K_\alpha$ of the entire pivot 7 becomes:

$$K_\alpha = 2\frac{EI}{l}\left(kl\frac{kl\cos(kl) - \sin(kl)}{kl\sin(kl) + 2(\cos(kl) - 1)} + 2\right) \qquad (18)$$

with kl related to $x_0$ with Eq. (15). The graph of $K_\alpha$ in function of $x_0$ is shown in FIG. 9.

In order to design a suspension 7 with near-zero-stiffness, then Eq. (18) leads to kl=5.02, which means, from Eq. (15) that:

$$x_0 = 25.18 \frac{EI}{K_0 l^2} \quad (19)$$

As a consequence, if kl<5.02, the suspension 5 has a positive stiffness and if kl>5.02, its angular stiffness becomes negative.

Figure 11:
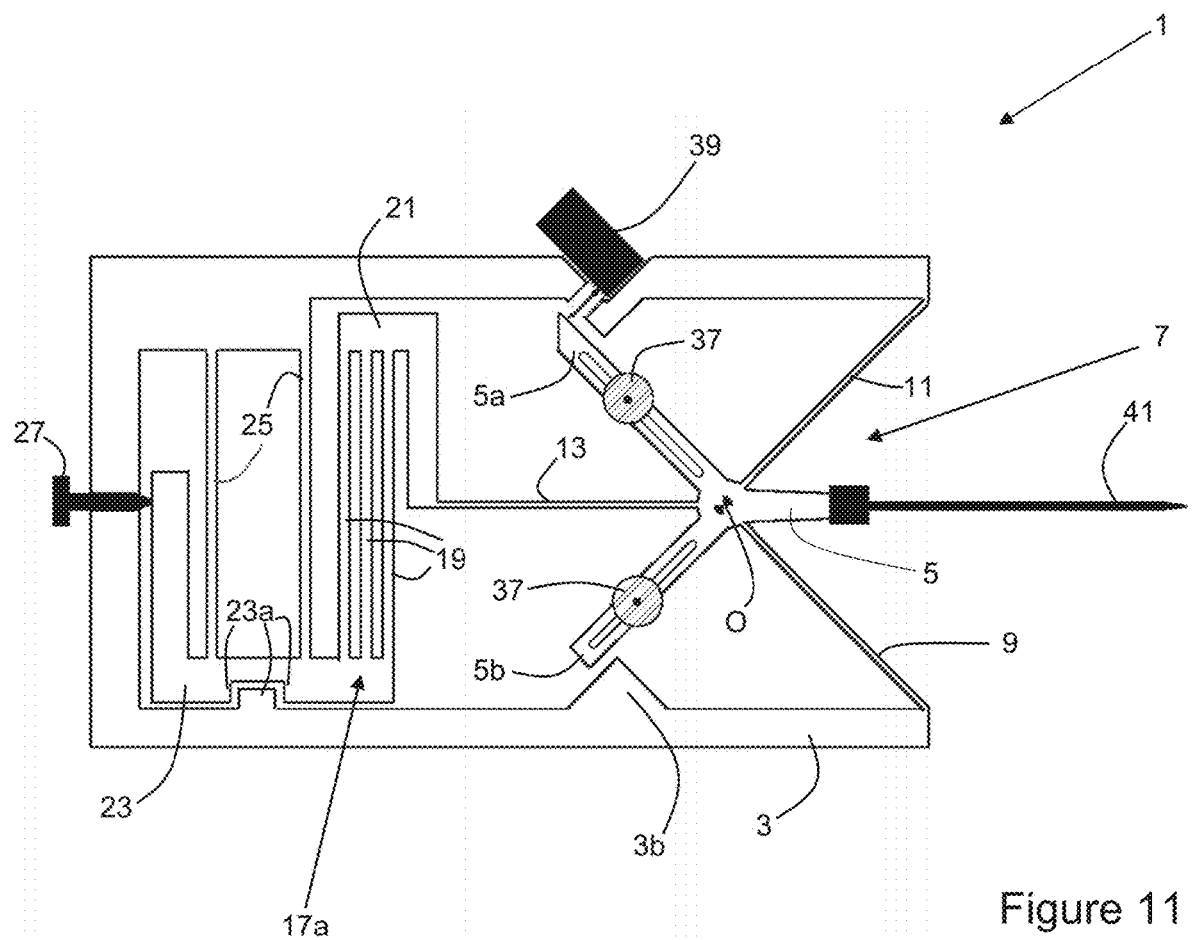
FIG. 11: a schematic plan view of a further embodiment of a flexure pivot based system according to the invention.

The theoretical basis for the functioning of the pivot 7 used in the system 1 of FIG. 1 having now been described, a further variant with a different configuration of flexures is illustrated in FIG. 11, and only its principal differences with that of FIG. 1 will be described in detail since the remainder of the system 1 functions in the same manner. The above analysis can of course be modified for the configuration of FIG. 11, but the overall principle remains unchanged.

This variant differs from that of FIG. 1 primarily in that the first, second and third flexures 9, 11, 13 are arranged in a Y configuration rather than in a T configuration.

More particularly, the first flexure 9 and second flexure 11 remain orthogonal to each other in the plane of the system 1 when it is unstressed, but they are each arranged at an obtuse angle of ideally substantially 135° with respect to the third flexure 13. In other words, each of the first and second flexures 9, 11 makes an acute angle of 45° with respect to the extension of the axis of the third flexure 13, and are situated on opposite sides thereof. The principle axis of the pivot as defined by the three flexures 9, 11, 13 is hence coaxial with the third flexure 13, and follows a locus which is equidistant from each of the first flexure 9 and second flexure 11 when the system is at rest. In other words, the principal axis (i.e. the extension of the axis of the third flexure 13) bisects the first and second flexures 9, 11, which have mirror symmetry with respect to the principal axis when the suspension 7 is in its neutral position. However, such mirror symmetry, while preferred, is not obligatory, and in such a case the first and second flexures 9, 11, make a first non-zero angle with respect to each other (ideally in the range of 10° to 170°, more preferably in the range of 45° to 135°), and third flexure 13 hence makes a second non-zero angle with respect to each of the first flexure 9 and the second flexure 11 which is different in respect of each of the flexures 9, 11 in question.

Second flexure 11 is attached directly to the frame 3 at its root, although an offset mechanism 29 can be provided as before.

This arrangement presents a greater degree of symmetry to that of FIG. 1, and enables a probe tip 41, or extension of the lever 5 which will serve as a probe, to extend substantially along the principal axis P.

Figure 12:
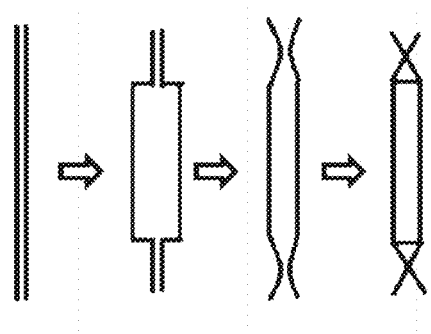
FIG. 12: a schematic view of various equivalent types of flexures.

Although in the foregoing, the various flexures have been illustrated as simple blades, their well-known functional equivalents can equally be used, namely those illustrated schematically in FIG. 12. From left to right, the functionally equivalent flexures are:
 a simple blade flexure;
 a substantially rigid bar situated between two blades;
 a substantially rigid bar situated between two flexible hinges such as cols; and
 a substantially rigid bar situated between two pairs of crossed blades extending in a different, parallel planes.

For further information on such equivalences, the work "*The Art of Flexure Mechanism Design*", Cosandier, Henein, Richard and Rubbert, ISBN 9782940222568 can be consulted, and forms part of the general knowledge of the person skilled in the art of flexure mechanisms.

In terms of manufacturing, the frame 3 and arrangements of various flexures can be manufactured from a plate of material by wire EDM machining, or by conventional micromachining techniques which are well-known in the field of MEMS, e.g. by masking and etching, LIGA, sintering in a mould, photostructuring of photostructurisable glass, or similar. In terms of suitable materials, metals or alloys, whether crystalline or amorphous, can be used, as can silicon, silicon dioxide, silicon carbide, silicon nitride, (all of which can be monocrystalline, polycrystalline or amorphous), various forms of alumina (sapphire, ruby etc.), glass, and other materials known in the field.

Although the invention has been disclosed in reference to specific embodiments, variations thereto are possible without departing from the scope of the invention as defined in the appended claims.

The invention claimed is:

1. Flexure pivot based system being one of: a force sensor, a force limiting device arranged to exert a predetermined threshold force, a torque limiting device arranged to exert a predetermined threshold torque, a programmable mechanical memory, or an accelerometer, said flexure pivot based system comprising a substantially rigid frame supporting a lever by means of a suspension mechanism comprising:
 a first flexure extending from said frame to a junction with said lever;
 a second flexure extending from said frame to said junction and arranged at a first non-zero angle to said first flexure in a neutral position of said suspension mechanism,
 a third flexure extending from said junction to a preloading system at a second non-zero angle to at least one of said first flexure and said second flexure in a neutral position of said suspension mechanism, said preloading system being arranged to apply a force in a direction substantially coaxial with said third flexure.

2. The flexure pivot based system according to claim 1, wherein said first non-zero angle is substantially 90°.

3. The flexure pivot based system according to claim 1, wherein said third flexure is substantially coaxial with said first flexure in a neutral position of said suspension mechanism.

4. The flexure pivot based system according to claim 3, wherein said third flexure extends along a principal axis in a neutral position of said suspension mechanism, said junction and said second flexure being arranged such that said second flexure crosses said principal axis at a point of rotation defined by said suspension.

5. The flexure pivot based system according to claim 4, wherein the ratio of length of the second flexure between said point of rotation and its attachment point with said junction with respect to the overall length of said second flexure is substantially 1/2 or 1/8.

6. The flexure pivot based system according to claim 1, wherein said third flexure extends at an obtuse angle to each of said first flexure and said second flexure in a neutral position of said suspension mechanism, said first flexure and said second flexure being arranged symmetrically with respect to the third flexure.

7. The flexure pivot based system according to claim 1, wherein said second flexure is coupled to said frame by means of an adjustment system arranged to apply an offset torque to said second flexure.

8. The flexure pivot based system according to claim 7, wherein said adjustment system comprises a Remote Centre Compliance flexure pivot system and an adjustment arm, said adjustment arm being movable in rotation.

9. The flexure pivot based system according to claim 8, wherein said Remote Centre Compliance flexure pivot system is arranged so as to define a pivot point located substantially at a midpoint of said second flexure.

10. The flexure pivot based system according to claim 1, wherein said frame, said first flexure, said second flexure, said third flexure, said lever and said preloading system are substantially coplanar.

11. The flexure pivot based system according to claim 1, wherein said preloading system comprises a plurality of parallel flexures.

12. The flexure pivot based system according to claim 11, wherein the extension of said third flexure in a neutral position of said suspension intersects a midpoint of said plurality of parallel flexures.

13. The flexure pivot based system according to claim 1, further comprising at least one adjustable mass provided on an arm of said lever.

14. The flexure pivot based system according to claim 1, further comprising a sensor fixed to said frame and arranged to measure the position of said lever.

15. The flexure pivot based system according to claim 1, wherein said preloading system is arranged to apply a force with a magnitude and sign sufficient to render said lever bistable.

16. The flexure pivot based system according to claim 1, wherein said preloading system is arranged to apply a force with a magnitude and sign sufficient to give substantially no resistance to rotation of said lever.

17. The flexure pivot based system according to claim 6, wherein said obtuse angle is substantially 135.

* * * * *